United States Patent [19]
Karube

[11] Patent Number: 5,237,150
[45] Date of Patent: Aug. 17, 1993

[54] METHOD OF CUTTING WORKPIECE WITH LASER BEAM

[75] Inventor: Norio Karube, Machida, Japan
[73] Assignee: Fanuc Ltd., Minamitsuru, Japan
[21] Appl. No.: 761,802
[22] PCT Filed: Jan. 11, 1991
[86] PCT No.: PCT/JP91/00022
  § 371 Date: Sep. 16, 1991
  § 102(e) Date: Sep. 16, 1991
[87] PCT Pub. No.: WO91/10533
  PCT Pub. Date: Jul. 25, 1991

[30] Foreign Application Priority Data
  Jan. 19, 1990 [JP] Japan ............... 2-10029
[51] Int. Cl.⁵ ............... B23K 26/00
[52] U.S. Cl. ............... 219/121.72; 219/121.74; 219/171.84
[58] Field of Search ............... 219/121.75, 121.84, 219/121.63, 121.64, 121.77, 121.74, 121.72, 121.73

[56] References Cited
U.S. PATENT DOCUMENTS

| | | | |
|---|---|---|---|
| 3,419,321 | 2/1966 | Barber et al. | 219/121.7 |
| 4,167,662 | 9/1979 | Steen | 219/121.84 |
| 4,275,288 | 6/1981 | Mukosch et al. | 219/121.75 |
| 4,467,168 | 8/1984 | Morgan et al. | 219/121.67 |
| 4,675,500 | 7/1987 | Kunz et al. | 219/121 |

FOREIGN PATENT DOCUMENTS

| | | | |
|---|---|---|---|
| 0143743 | 6/1985 | European Pat. Off. | |
| 0215292 | 12/1984 | Japan | 219/121.84 |
| 0062294 | 3/1989 | Japan | 219/121.84 |
| 8402868 | 8/1984 | World Int. Prop. O. | 219/121.84 |

OTHER PUBLICATIONS

M. Arrabito, et al. Laser Perforation Technique, IBM Disclosure Bulletin vol. 13, No. 10, p. 3098, Mar. 1971.
Moderne Fertigung, No. 10, Oct. 1986, pp. 45–48, Landberg am Lech, DE; W. Sutter: "Neue Lasertechnik Verbreitet die Anwendungsmöglichkeiten" * pp. 1–2*.

Primary Examiner—C. L. Albritton
Attorney, Agent, or Firm—Staas & Halsey

[57] ABSTRACT

A thick workpiece is cut by a laser beam of high output power. A laser beam dominantly in a ring mode, with a central region thereof being hollow, is applied to the workpiece to cut the workpiece. The laser beam dominantly in the ring mode is effective to reduce optical distortion due to laser beam absorption in a central region of a focussing optical system, e.g., a focussing lens, thereby preventing focussing characteristics from being degraded. The focussing optical system may system may be cooled by a gas applied to its surface. Alternatively, a KCL (potassium chloride) lens may be used as the focussing optical system.

3 Claims, 3 Drawing Sheets

METHOD OF CUTTING WORKPIECE WITH LASER BEAM

BACKGROUND OF THE INVENTION

1. Field of the Invention

The present invention relates to a method of cutting a workpiece such as a thick plate of mild steel, for example, with a laser beam, and more particularly to a method of cutting a workpiece with a laser beam which is focused with improved focussing characteristics that would otherwise be degraded by optical distortion.

2. Description of the Related Art

Conventional $CO_2$ laser cutting machines mainly have had a laser beam output of 1 KW or less, and have been able to cut workpieces of mild steel, for example, which are up to 9 mm thick. In the above power range, the primary technical concern has been how small a focus spot can be made by focussing laser beam. The focussing a characteristics of the laser beam are affected by barious factors such as the mode order that determines the divergent angle of the laser beam, the laser beam diameter on the focussing lens which determines a diffraction limitation, and the aberrations of the focussing optical system. Particularly, the mode order has been considered to be most important for the $CO_2$ laser cutting machines, and the achievement of the TEM00 mode which is the lowest-order mode is given the utmost importance. The TEM00 mode has the smallest divergent angle, and has the best focussing characteristics which make fine machining possible.

The above approach has also been employed for cutting machines with high-power $CO_2$ lasers. While attempts to produce higher-power $CO_2$ lasers. While attempts and attempts to achieve the TEM00 mode are generally contradictory, various efforts have been made to lower the mode order.

However, we have found, through experimental and theoretical analysis, that in output power ranges higher than 2 KW, the focussing optical system suffers optical distortion in the mode primarily of TEM00, and behaves in a manner completely different from that when the output power is lower, making it impossible to focus the laser beam into a small beam spot.

The above drawback manifests itself especially with a ZnSe lens. More specifically, the lens undergoes a temperature rise due to laser beam absorption. Since the power density in the central region of the lens greatly increases in the TEM00 mode, the temperature distribution becomes similar to the power density distribution. As a result, the lens region which suffers the high temperature is thermally expanded and has an increased refractive index, resulting in a localized change in the focussing characteristics.

The degradation of the focussing characteristics in the TEM00 mode goes far beyond its combined inproving effect of the three factors that affect the focussing characteristics. Therefore, the prior approach to improve the focussing characteristics has proven disadvantageous in the output power ranges beyond 2 KW.

SUMMARY OF THE INVENTION

In view of the aforesaid difficulties of the conventional methods of cutting a workpiece with a laser beam, it is an object of the present invention to provide a method of cutting a workpiece with a laser beam mainly in a ring mode, thereby improving focussing characteristics that would otherwise be degraded by optical distortion.

Another object of the present invention is to provide a method of cutting a workpiece with a laser beam while applying a gas to the surface of a focussing optical system to cool the focussing optical system, thereby improving focussing characteristics that would otherwise be degraded by optical distortion.

Still another object of the present invention is to provide a method of cutting a workpiece with a laser beam using a KCL lens as a focussing lens, thereby improving focussing characteristics that would otherwise be degraded by optical distortion.

Yet still another object of the present invention is to provide a method of cutting a workpiece with a laser beam using a reflecting mirror as a focussing optical system, thereby improving focussing characteristics that would otherwise be degraded by optical distortion.

To achieve the above objects, there is provided in accordance with the present invention a method of cutting a thick workpiece with a laser beam of high output power, comprising the step of applying a laser beam mainly in a ring mode, with a central region thereof being hollow, to the workpiece to cut the workpiece.

There is also provided a method of cutting a thick workpiece with a laser beam of high output power, comprising the step of applying a gas to a surface of a focussing optical system to cool the focussing optical system while the laser beam is passing through the focussing optical system toward the workpiece.

There is further provided a method of cutting a thick workpiece with a laser beam of high output power, comprising the step of passing the laser beam through a KCL (potassium chloride) lens as a focussing lens to focus the laser beam onto the workpiece.

Furthermore, there is provided a method of cutting a thick workpiece with a laser beam of high output power, comprising the step of reflecting the laser beam with a focussing reflecting mirror toward the workpiece.

The laser beam mainly in the ring mode, with a central region thereof being hollow, is effective to reduce optical distortion due to laser beam absorption in a central region of a focussing optical system, e.g., a lens, thereby preventing focussing characteristics from being degraded. If the laser beam is mainly in a TEM01 mode and produced with an output power of 2 KW or more, it can cut the workpiece in a fine way. The laser beam profile in this mode can be transmitted over a long distance for cutting the workpiece. Inasmuch as the thick workpiece is usually long, the ability to transmit the laser beam over the long distance (e.g., 20 m) is of practical importance.

When the gas is blown onto the surface of the focussing optical system, e.g., a lens, the central region thereof, which tends to be heated more intensely than other regions, is directly cooled. The temperature of the lens is thus lowered to reduce optical distortion due to laser beam absorption in the central region of the lens, thereby preventing focussing characteristics from being degraded.

A KCL (potassium chloride) lens as a focussing lens suffers less optical distortion, and hence is effective to prevent focussing characteristics from being degraded. When the temperature of the KCL lens rises, it undergoes thermal expansion and at the same time decreases the value of the refractive index. This expansion and refractive index decrease of the KCL lens cancel out each other in the degree of optical distortion. Therefore, any increases in optical distortion are suppressed.

When a focussing reflecting mirror is used as the focussing optical system, it only suffers distortions induced by thermal deformation, and not the change of refractive index because it is a reflecting mirror, but not a refractive system, and prevents a degradation of focussing characteristics which would otherwise be caused by a refractive index variation.

DESCRIPTION OF THE PREFERRED EMBODIMENTS

An embodiment of the present invention will hereinafter be described with reference to the drawings.

Figure 1:
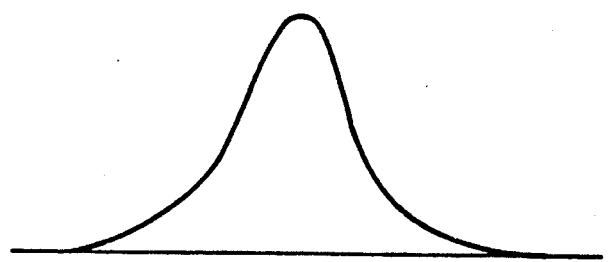
FIGS. 1(a), 1(b), and 1(c) are diagrams illustrative of the manner in which a laser beam mode is made hollow according to the present invention.
Figure 1:
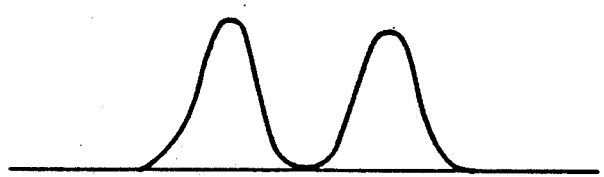
Figure 1:
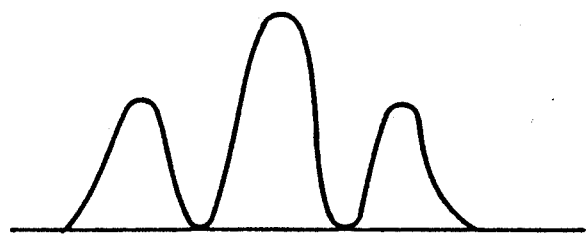

FIGS. 1(a), 1(b), and 1(c) are diagrams illustrative of the manner in which a laser beam mode is made hollow according to the present invention. FIG. 1(a) shows a TEM00 mode, FIG. 1(b) a TEM01 mode, and FIG. 1(c) a TEM10 mode. Only the TEM01 mode has a hollow center. Even if the laser output power is the same as those of the other modes, the power density is low at the center of the TEM01 mode. Since the center would tend to be overheated in a focussing optical system which is peripherally cooled, the TEM01 mode with no laser beam present in its center is less likely to produce optical distortion.

The mode may not necessarily fully be the TEM01 mode, but may contain the TEM00 mode and the TEM01 mode though it should dominantly be the TEM01 mode. The pure TEM01 mode is effective to prevent hopping between different modes, and its higher mode stability results in higher cut surface quality.

In particular, a RF discharge-pumped laser is effective to obtain the TEM01 mode, because a high gain is present near the tube wall, which is favorable to the TEM01 mode. Another method is for the resonator to have an aperture for purifying the mode or a central absorber therein.

Figure 2:
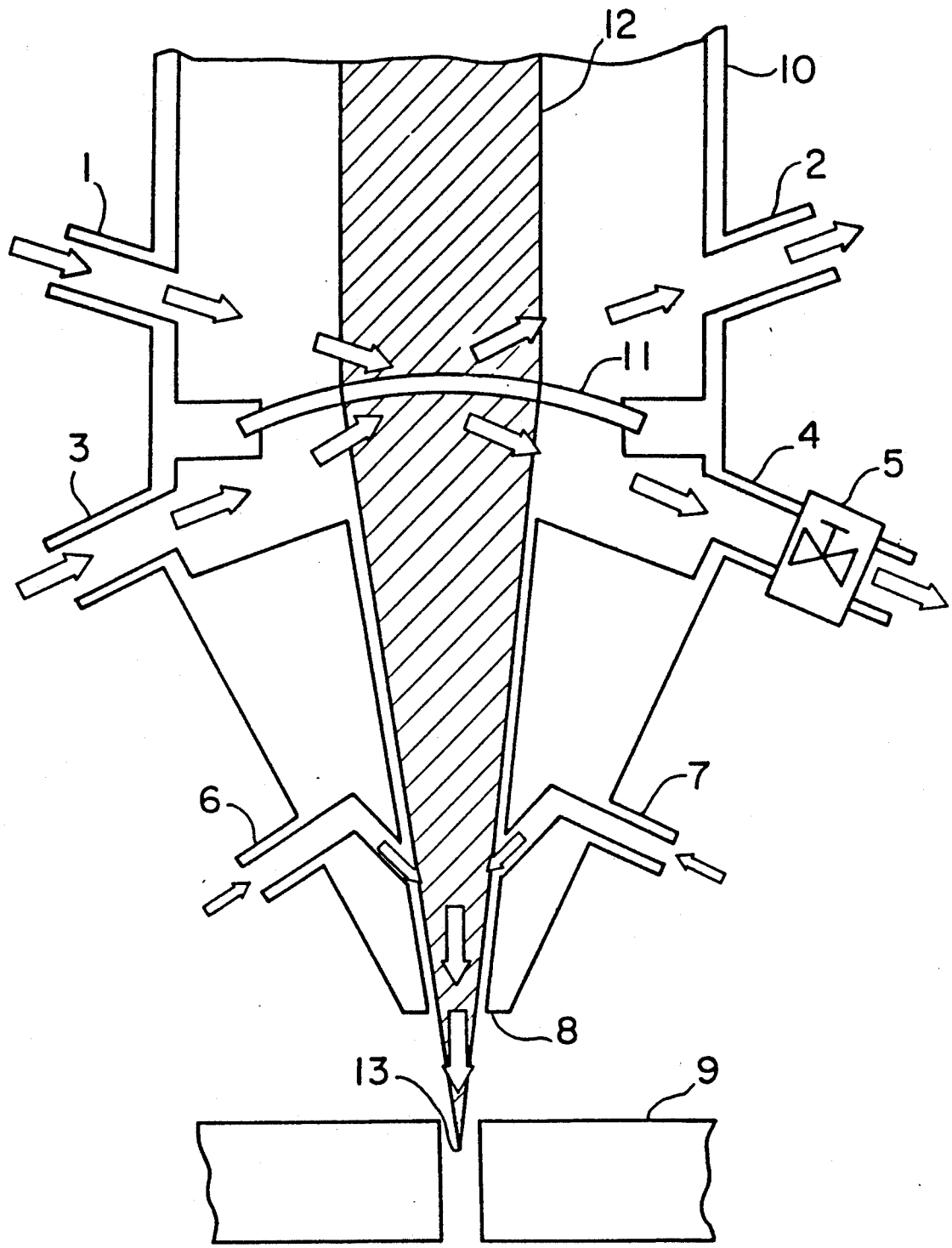
FIG. 2 is a fragmentary view showing a process of cooling a focussing lens.

FIG. 2 shows a process of cooling a focussing lens. Heretofore, the focussing lens has been cooled at its peripheral portion indirectly by water, and particularly in the TEM00 mode, suffered optical distortion since it is heated locally in the central region thereof. According to the present invention, the central region of the focussing lens is cooled directly by air. In FIG. 2, the focussing lens, denoted at 11, is held in a holder 10. A laser beam 12, which is shown hatched, passes through the focussing lens 11. The holder 10 has a nozzle 8 facing a workpiece 9 to be cut. The laser beam 12 is focussed by the focussing lens 11 into a focal point 13 positioned outside of the nozzle 8 and on the workpiece 9.

The manner in which the workpiece 9 is cut by the laser beam is well known in the art, and will not be described in detail. According to the present invention, a cooling gas is applied to both surfaces of the focussing lens 11 to forcibly cool the focussing lens 11. For example, clean air is introduced from a cooling gas inlet 1 in order to cool the upper surface of the focussing lens 11. The clean air is ejected against the focussing lens 11 in the direction indicated by the arrows, and then discharged from a cooling gas outlet 2. The clean air thus applied also serves to prevent the surface of the focussing lens 11 from being contaminated. Likewise, to cool the lower surface of the focussing lens 11, oxygen or air is introduced from a cooling gas inlet 3, and discharged from a cooling gas outlet 4. The cooling gas flow is regulated by a variable valve 5 because the amount of the cooling gas to be applied to the focussing lens 11 has to be kept at an optimum level. The downstream side of the valve 5 may be evacuated by a discharge pump.

An auxiliary gas is introduced from gas inlets 6, 7 into the nozzle 8, and then ejected from the nozzle 8 against the workpiece 9 while the workpiece 9 is being cut by the laser beam.

When the focussing lens 11 is thus forcibly cooled by the cooling gas, the focussing lens 11 is free from optical distortion, and can focus the laser beam with good focussing characteristics even though the mode is dominantly the TEM01 mode. Therefore, the laser beam can cut workpiece 9 even if it comprises a thick plate. Since the workpiece 9, in the form of a thick plate, is long, the cutting point on the workpiece 9 may be about 20 mm apart from the laser oscillator. While the TEM00 mode shown in FIG. 1(a) cannot be maintained over a distance of 20 m, the method of the invention which employs the laser beam dominantly in the TEM01 mode is free from such a problem in cutting the long workpiece 9.

According to a third process, a KCL (potassium chloride) lens is used as a focussing lens. The KCL lens does not suffer optical distortion even without being cooled. This is because when the temperature of the KCL lens rises, it expands and decreases in the value of refractive index, and this expansion and the refractive index decrease of the KCL lens cancel out each other. The KCL lens may also be used in the transmission of a laser beam over a long distance.

Figure 3:
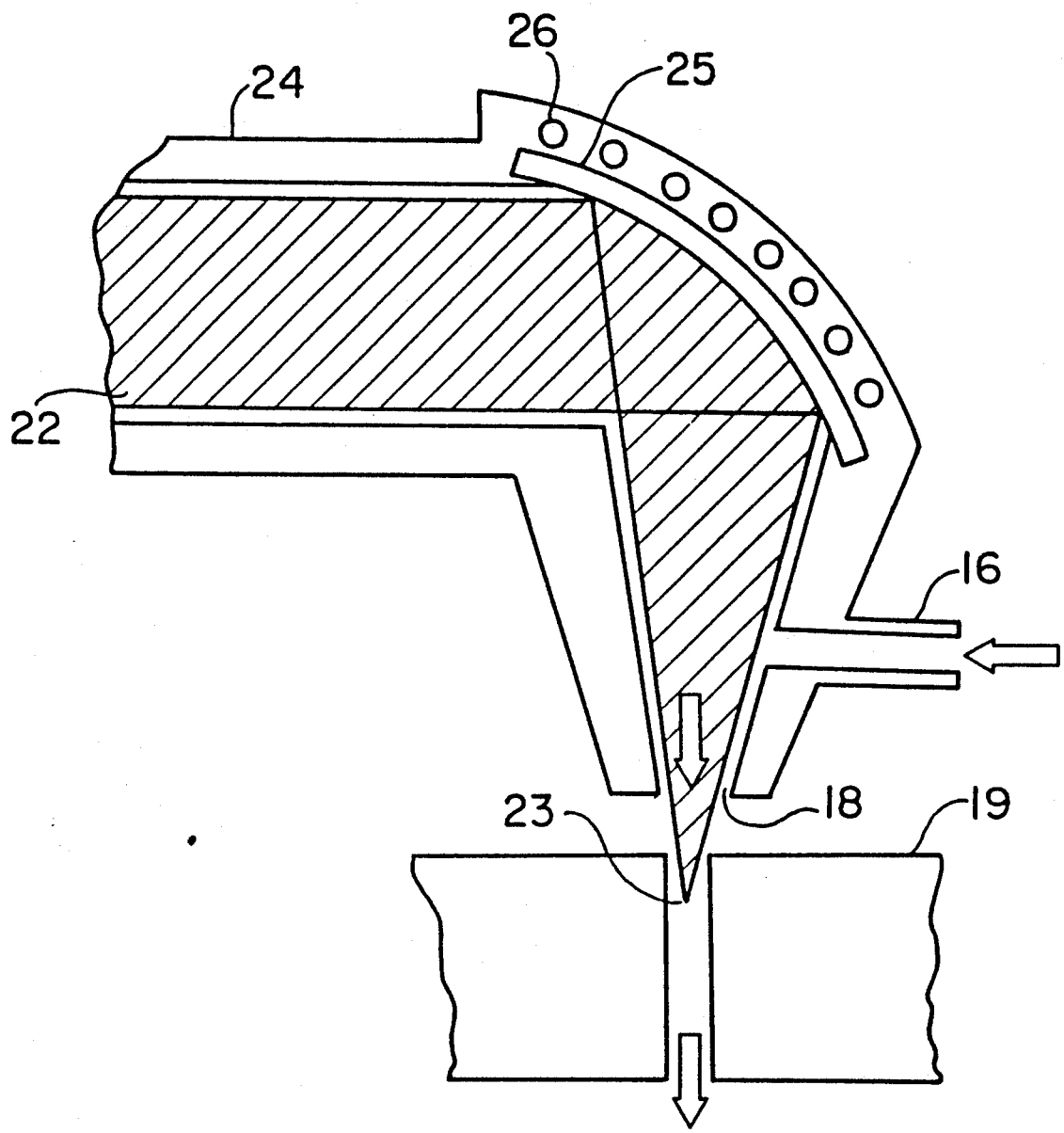
FIG. 3 is a fragmentary view of an arrangement using a focussing reflecting mirror.

FIG. 3 shows an arrangement which employs a focussing reflecting mirror. The focussing reflecting mirror comprises an off-axis parabolic mirror 25 for focussing a laser beam 22 through a nozzle 18 onto a focal point 23 on a workpiece 19. The parabolic mirror 25 is held in a holder 24. An auxiliary gas is introduced from a gas inlet 16 into the nozzle 18. Since the off-axis parabolic mirror 25 is a reflecting mirror, but not a refractive system, it only suffers distortions induced by thermal deformation. As shown in FIG. 3, the entire reflecting surface of the parabolic mirror 25 may be cooled indirectly from its back by cooling water flowing through a cooling water passage 26. The arrangement shown in FIG. 3 is also capable of solving the problems which would otherwise occur in the transmission of a laser beam over a long distance.

The above four methods prevent a degradation of focussing characteristics which would otherwise result from optical distortion of the focussing optical syatem, and are effective in cutting a workpiece with a laser beam of high output power.

The first method of using the laser beam mainly in the ring mode, i.e., which is hollow in its center, may be combined with either one of the second method of cooling the focussing lens with the cooling gas, the third method of using the KCL lens, and the fourth method of using the focussing reflecting mirror, for increased advantages.

With the above methods, a $CO_2$ laser having an output power of 3 KW can cut a workpiece of mild steel, which is up to 25 mm thick, and can cut a workpiece of mild steel, which is up to 19 mm, in a fine cutting process. The methods can also give stable focussing characteristics to large-size cutting apparatus which are required to transmit the laser beam over the distance of 20 m or more.

As described above, since the present invention prevents a degradation in the focussing characteristics which would otherwise be induced by optical distortion of the focussing optical system when the workpiece is cut with a laser beam of high output power, the methods of the invention are capable of cutting relatively thick workpieces, which have heretofore been unable to be cut.

In addition, the methods according to the present invention can also give stable focussing characteristics to large-size cutting apparatus which are required to transmit the laser beam over a long distance.

I claim:

1. A method of cutting a thick workpiece with a laser beam of high output power, comprising the steps of:
   applying a laser beam dominantly in a ring mode, with a central region thereof being hollow;
   independently applying a gas to each of an upper and a lower surface of a focussing lens to cool the lens while the laser beam is passing through the lens toward the workpiece; and
   independently supplying an auxiliary gas to a nozzle through which the laser beam passes and ejecting the auxiliary gas from the nozzle against the workpiece.

2. A method of cutting a thick workpiece with a laser beam of high output power, comprising the steps of:
   applying a laser beam dominantly in a ring mode, with a central region thereof being hollow; and
   passing the laser beam through a potassium chloride lens as a focussing lens to focus the laser beam onto the workpiece while suppressing optical distortion, said potassium chloride lens being of the type that expands when its temperature increases thereby causing a decrease in the value of the refractive index whereby the expansion and the decrease of the value of the refractive index cancel out each other to suppress optical distortion.

3. A method of cutting a thick workpiece with a laser beam of high output power, comprising the steps of:
   applying a laser beam dominantly in a ring mode, with a central region thereof being hollow;
   reflecting the laser beam with a focussing reflecting mirror toward the workpiece;
   cooling the focussing reflecting mirror; and
   supplying an auxiliary gas to a nozzle through which the laser beam passes and ejecting the auxiliary gas from the nozzle against the workpiece.

* * * * *

UNITED STATES PATENT AND TRADEMARK OFFICE
CERTIFICATE OF CORRECTION

PATENT NO. : 5,237,150
DATED : Aug. 17, 1993
INVENTOR : Norio Karube

It is certified that error appears in the above-indentified patent and that said Letters Patent is hereby corrected as shown below:

```
Title Page, Abstract [57], lines 8 and 9,
     delete "system may".

Col. 1, line 21, change "barious" to --various--;
     line 34, insert --output power from laser
oscillatiors-- after "higher";
     line 34, delete "power CO₂ lasers.  While".
     line 35, delete "attempts".
```

Signed and Sealed this

Twelfth Day of April, 1994

Attest:

BRUCE LEHMAN

*Attesting Officer*  *Commissioner of Patents and Trademarks*